(No Model.)
G. O. HOUCK.
CORN SHOCK TYER.
No. 549,066. Patented Oct. 29, 1895.
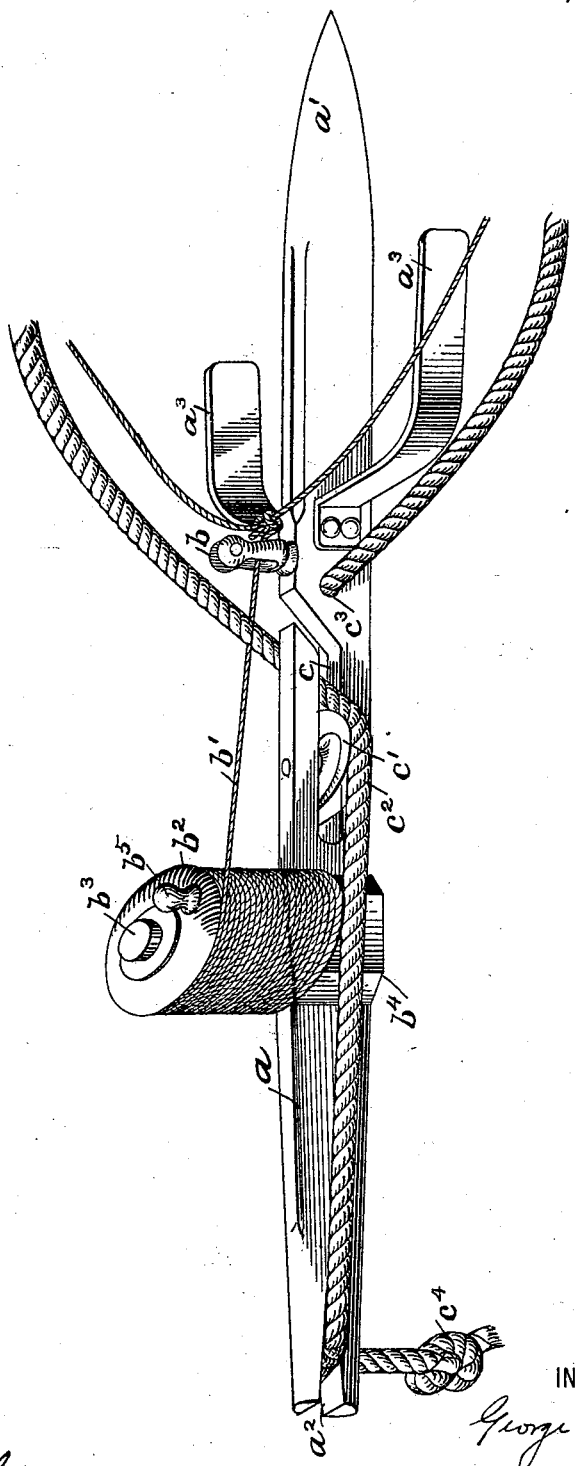
WITNESSES:
G. M. Gridley
Chas. J. Welch
INVENTOR
George O. Houck
BY
Paul A. Staley
ATTORNEY

UNITED STATES PATENT OFFICE.

GEORGE O. HOUCK, OF SPRINGFIELD, OHIO, ASSIGNOR OF ONE-HALF TO WILLIAM H. HOUCK, OF SAME PLACE.

CORN-SHOCK TYER.

SPECIFICATION forming part of Letters Patent No. 549,066, dated October 2, 1895.

Application filed February 4, 1895. Serial No. 537,238. (No model.)

*To all whom it may concern:*

Be it known that I, GEORGE O. HOUCK, a citizen of the United States, residing at Springfield, in the county of Clark and State of Ohio, have invented certain new and useful Improvements in Corn-Shock Tyers, of which the following is a specification.

My invention relates to improvements in devices for compressing and tying corn-shocks; and it consists in the constructions and combinations hereinafter set forth, and pointed out in the claim.

The accompanying drawing is a perspective view of a device embodying my invention.

In the said drawing, $a$ represents a straight bar, preferably of wood, the main body being rectangular in shape, but pointed at one end, as shown at $a'$, and at the opposite end rounded and provided with a V-shaped notch $a^2$. On opposite sides of this bar, at a suitable distance back of the point $a'$, is secured angularly-shaped arms $a^3\ a^3$, which extend outwardly, thence forwardly, to form prongs on each side of the bar $a$, the said bar and side pieces being not unlike a three-tined fork, with the center tine consisting of the pointed bar and being slightly longer than the side pieces.

Immediately back of the projecting pieces $a^3$, and secured to the top of the bar $a$, is a bifurcated guide $b$, through which is threaded a cord $b'$ from a spool $b^2$, said spool being journaled on a spindle $b^3$, also secured to the bar $a$ and projecting vertically therefrom in the same plane with the guide $b$, the bar $a$ being widened by the addition of a piece $b^4$ to form a base or support for said spool and an additional support for the spindle $b^3$.

Between the spool $b^2$ and the guide $b$ is a slotted opening $c$, said opening being at one end extended upwardly at an angle to the top of the bar. Within this slotted opening is journaled a pulley $c'$, over which a rope $c^2$ is adapted to pass. This rope $c^2$ is secured at one end to the bar $a$, at a point between the side pieces $a^3$ and the slotted opening $c$, preferably by passing the rope through said bar, as shown at $c^3$, the rope being secured by a knot or other suitable projection on the opposite side of the bar. The opposite end of the rope, which may be of any suitable length, may be provided with a knot $c^4$ in the usual way.

The operation of the device is as follows: When it is desired to bind or tie a shock, the pointed end $a'$ of the bar is inserted between the stalks, as are also the side prongs or pieces $a^3$, so as to support the bar laterally from the shock at or near the point where it is to be tied. The rope $c^2$ hanging loosely from the side of the bar to which it is attached at $c^3$, and the end of the cord being adjacent thereto, the operator takes the end of the cord and the rope and winds around the shock, laying the end of the cord across the main portion thereof immediately in front of the guide $b$ and dropping the rope into the slotted opening $c$ so as to pass over the pulley $c'$. He then takes hold of the bar $a$ and draws on the rope so as to compress the shock. When it is sufficiently compressed, the rope is turned into the V-shaped notch $a^2$, where it is firmly held by the sides of said notch. The cord is then tied at a point in front of the guide $b$ and severed, the free end being drawn out sufficiently through the guide to be accessible for the next operation. The rope is then loosened from the V-shaped notch $a^2$ and removed from the slotted opening $c$, so as to be ready for another operation.

The spool $b^2$ may be provided with a handle $b^5$, by means of which it may be readily turned on its spindle to wind up any surplus cord which may be removed therefrom.

It will be understood that as the cord is needed to wind around the shock it will be unwound from the spool.

Having thus described my invention, I claim—

The combination with a straight bar $a$, pointed at one end and provided at the other with a V-shaped notch $a^2$, side prongs $a^3$, secured to said bar so as to extend laterally therefrom, thence forwardly parallel with said bar, a cord-spool $b^2$ secured to said prongs and a guide in front of said cord-spool, an open slot $c$, formed in said bar with the opening extending to the top thereof, a pulley $c'$ in said slot, a rope $c^2$ connected to said bar at one end and adapted to pass through said slot and around said pulley so as to engage the V-shaped notch in said bar, substantially as specified.

In testimony whereof I have hereunto set my hand this 28th day of January, A. D. 1895.

GEORGE O. HOUCK.

Witnesses:
OLIVER H. MILLER,
CHAS. I. WELCH.